(12) United States Patent
Mann et al.

(10) Patent No.: US 7,699,334 B1
(45) Date of Patent: Apr. 20, 2010

(54) FIFTH WHEEL SLIDE RAIL

(75) Inventors: Steven W. Mann, Gardendale, AL (US); Gavin C. Trinosky, Birmingham, AL (US)

(73) Assignee: Fontaine Fifth Wheel Co., Trussville, AL (US)

( * ) Notice: Subject to any disclaimer, the term of this patent is extended or adjusted under 35 U.S.C. 154(b) by 131 days.

(21) Appl. No.: 11/943,776

(22) Filed: Nov. 21, 2007

(51) Int. Cl.
*B62D 53/08* (2006.01)
(52) U.S. Cl. .............................. 280/407.1; 280/438.1
(58) Field of Classification Search ............. 280/433, 280/438.1, 407, 407.1, 441, 432
See application file for complete search history.

(56) References Cited

U.S. PATENT DOCUMENTS

| | | | |
|---|---|---|---|
| 3,181,889 A * | 5/1965 | Harris ...................... 280/438.1 |
| 3,580,611 A * | 5/1971 | McNitt ........................ 280/433 |
| 4,429,892 A | 2/1984 | Frampton et al. |
| 4,614,355 A | 9/1986 | Koch |
| 4,649,369 A | 3/1987 | Walker et al. |
| 4,738,462 A | 4/1988 | Adams |
| 5,265,900 A * | 11/1993 | Stack et al. ............... 280/438.1 |
| 5,344,173 A * | 9/1994 | Beeler et al. ............. 280/438.1 |
| 5,449,191 A | 9/1995 | Cattau |
| 5,707,070 A | 1/1998 | Lindenman et al. |
| 5,839,745 A | 11/1998 | Cattau et al. |
| 6,357,777 B1 | 3/2002 | Linger et al. |
| 6,592,140 B1 | 7/2003 | Alguera Gallego et al. |
| 6,736,420 B2 * | 5/2004 | Laarman et al. .......... 280/438.1 |
| 7,108,274 B2 | 9/2006 | Laarman |
| 7,114,740 B1 | 10/2006 | Mann et al. |
| 7,296,817 B1 | 11/2007 | Mann et al. |
| 2004/0173992 A1 * | 9/2004 | Stunder et al. ........... 280/438.1 |
| 2006/0202443 A1 * | 9/2006 | Sibley et al. ................ 280/441 |

* cited by examiner

*Primary Examiner*—Anne Marie M Boehler
(74) *Attorney, Agent, or Firm*—George Kobler; Lanier Ford Shaver & Payne

(57) ABSTRACT

A slide rail assembly for a fifth wheel hitch assembly is disclosed that includes an angle member for directly mounting the assembly to a truck frame member, and a t-shaped slide rail attached to a horizontal portion of the angle member, the t-shaped slide rail including a row of spaced gaps.

17 Claims, 5 Drawing Sheets

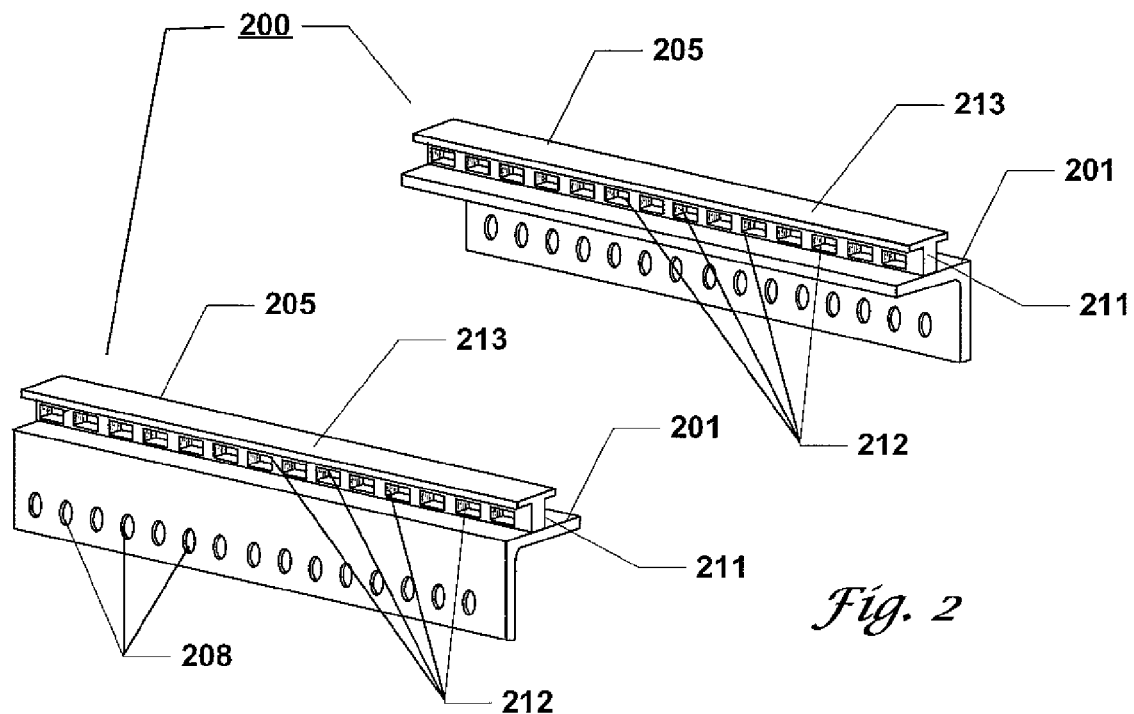
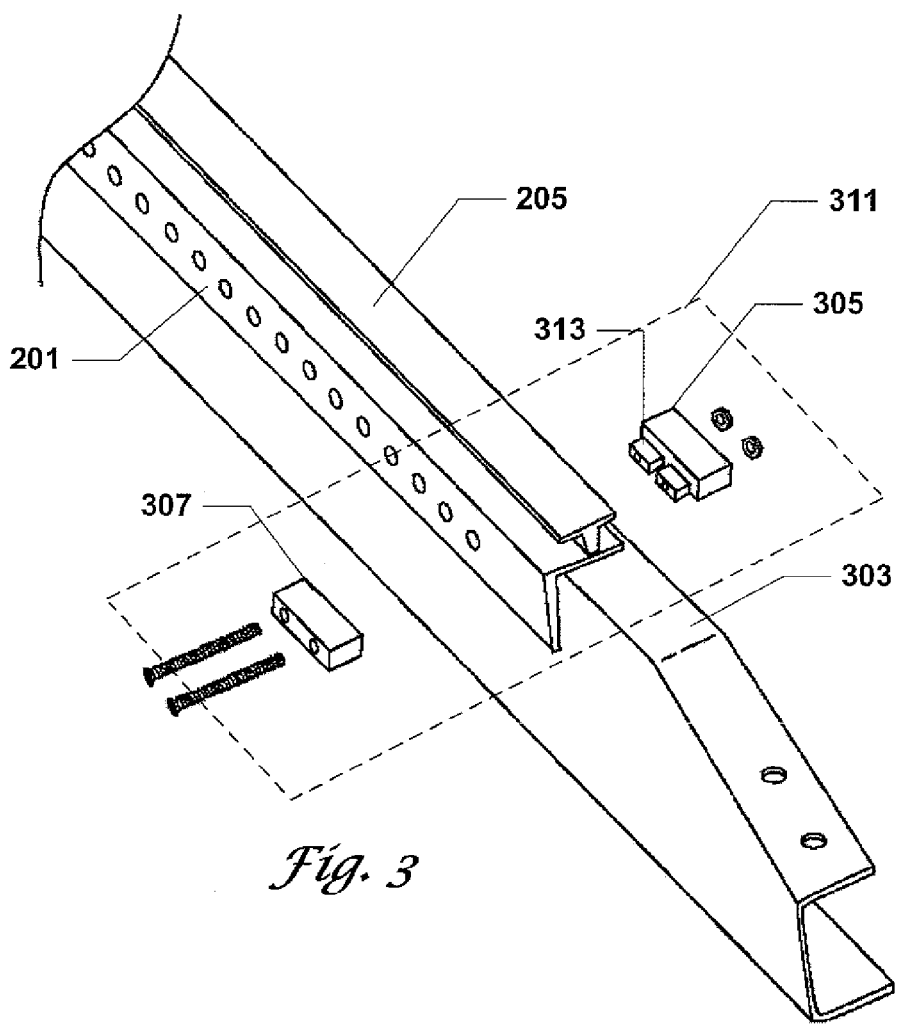
Fig. 2
Fig. 3

FIFTH WHEEL SLIDE RAIL

BRIEF DESCRIPTION OF THE DRAWINGS

The present invention is described with reference to the accompanying drawings. In the drawings, like reference numbers indicate identical or functionally similar elements. Additionally, the left-most digit(s) of a reference number identifies the drawing in which the reference number first appears.

FIG. 2 depicts an exemplary slide rail according to an aspect of the present invention;

FIG. 3 depicts an exemplary slide rail assembly mounted to a truck frame member;

DETAILED DESCRIPTION

The various embodiments of the present invention and their advantages are best understood by referring to FIGS. 1 through 5 of the drawings. The elements of the drawings are not necessarily to scale, emphasis instead being placed upon clearly illustrating the principles of the invention. Throughout the drawings, like numerals are used for like and corresponding parts of the various drawings.

The drawings represent and illustrate examples of the various embodiments of the invention, and not a limitation thereof. It will be apparent to those skilled in the art that various modifications and variations can be made in the present inventions without departing from the scope and spirit of the invention as described herein. For instance, features illustrated or described as part of one embodiment can be included in another embodiment to yield a still further embodiment. Moreover, variations in selection of materials and/or characteristics may be practiced to satisfy particular desired user criteria. Thus, it is intended that the present invention covers such modifications as come within the scope of the features and their equivalents.

Furthermore, reference in the specification to "an embodiment," "one embodiment," "various embodiments," or any variant thereof means that a particular feature or aspect of the invention described in conjunction with the particular embodiment is included in at least one embodiment of the present invention. Thus, the appearance of the phrases "in one embodiment," "in another embodiment," or variations thereof in various places throughout the specification are not necessarily all referring to its respective embodiment.

Terms such as "aft," "rear," "forward," "front," "lateral," "inboard" or "outboard," or the like, and variations or derivatives thereof, are to be understand in relation to the vehicle on which the fifth wheel is mounted. However, it is to be understood that the invention may assume various alternative orientations, except where expressly specified to the contrary. It is also to be understood that the specific devices and processes illustrated in the attached drawings, and described in the following specification are exemplary embodiments of the inventive concepts defined in the appended claims. Hence, specific dimensions and other physical characteristics relating to the embodiments disclosed herein are not to be considered as limiting, unless the claims expressly state otherwise.

Figure 1A:
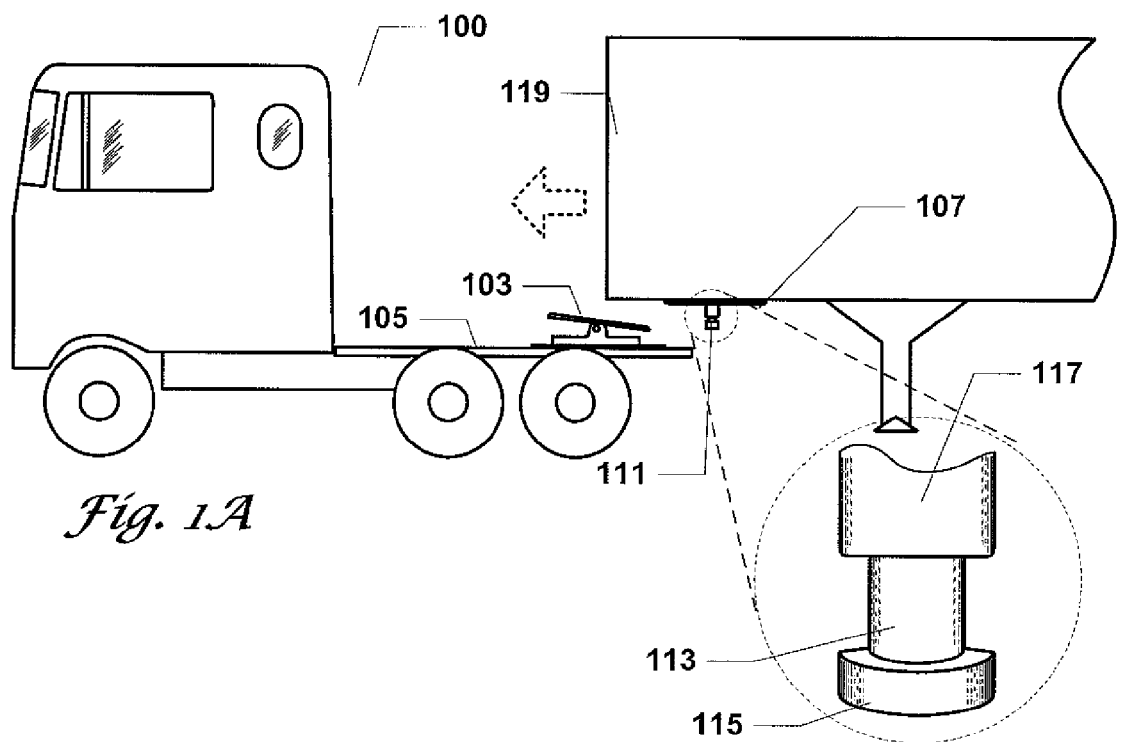
FIG. 1A is an exemplary tractor truck and trailer with a fifth wheel hitch.
Figure 1B:
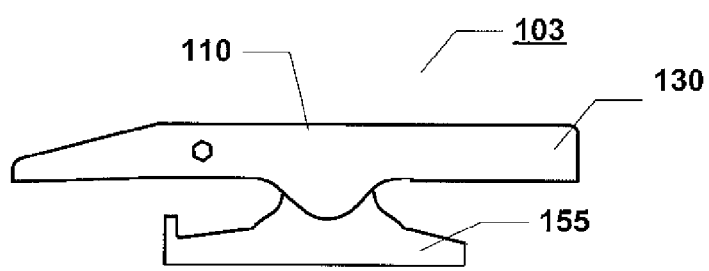
FIG. 1B is an exemplary fifth wheel hitch.
Figure 1C:
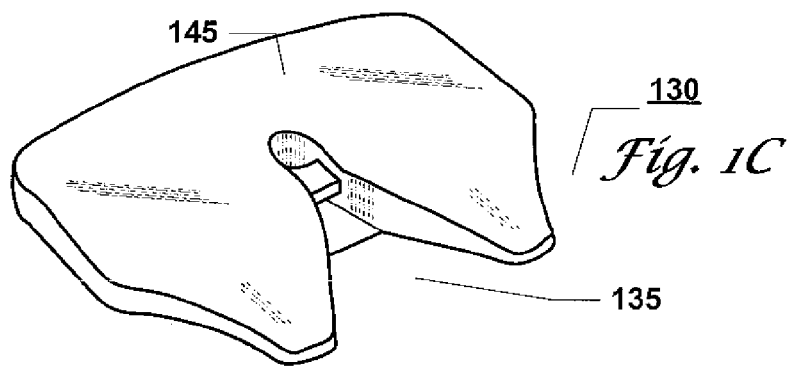
FIG. 1C is an exemplary hitch plate.

Referring to the Figures, fifth wheel hitches are well known in the field of towing trailers using a truck or tractor. FIGS. 1A through 1C depict an exemplary tractor and trailer hitch arrangement employing a fifth wheel hitch. Tractor 100 is affixed with a fifth wheel hitch 103 to rear of tractor frame 105. Fifth wheel hitch 103 includes a fifth wheel hitch assembly 110 pivotally mounted on pedestal 155. Fifth wheel hitch assembly 110 comprises hitch plate 130 which houses a locking mechanism underneath (shown and described in greater detail below) with slot 135 opening toward the aft end of fifth wheel assembly 110 for receiving a kingpin 111 from trailed 19.

Kingpin 111 typically extends downward from a trailer bearing plate 107, which rests upon fifth wheel assembly, specifically, upon load area 145 of fifth wheel hitch plate 130. Kingpin is, typically, a unitarily constructed article comprised of a lower flange 115 capping a shank 113 which extends from collar 117.

Figure 1D:
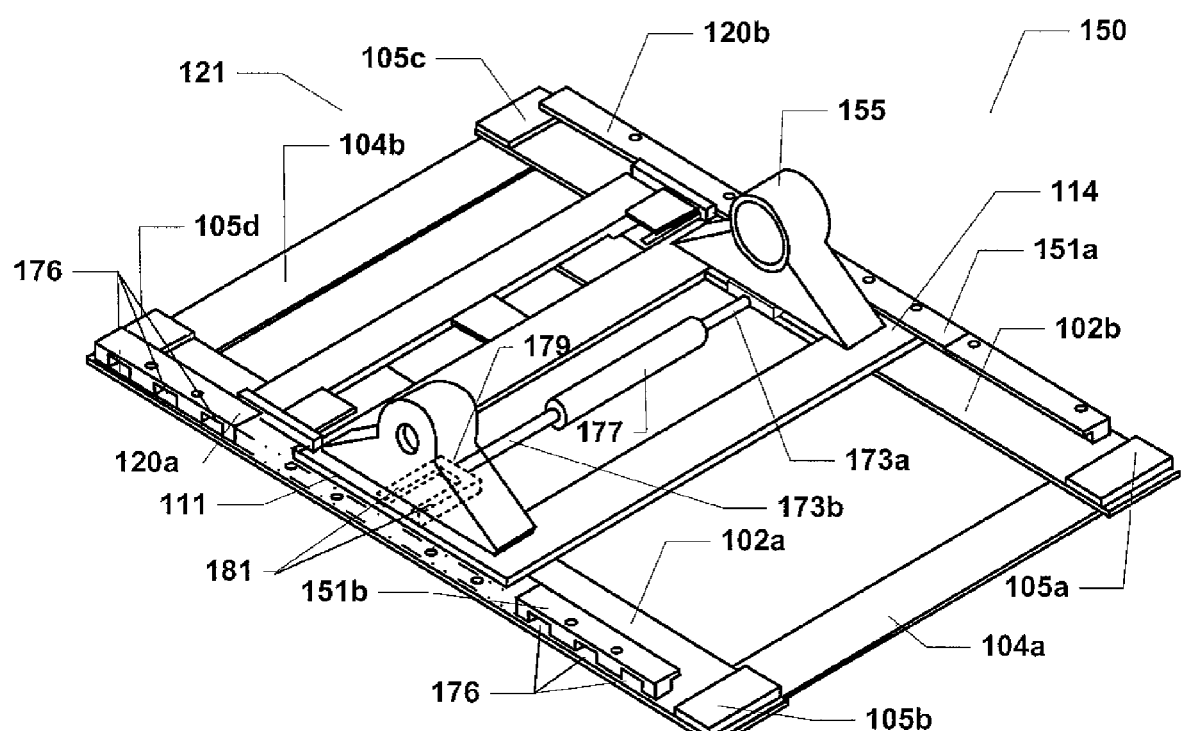
FIG. 1D is an exemplary prior art fifth wheel slide rail assembly.

FIG. 1D depicts an example of the prior art slide rail where slide rail assembly 120a is comprised of left and right slide rail plates 102a, b tied in parallel by two or more tie bars 104a, b which form slide frame 121. Left slide rail 102a is attached to the upper surface of left slide rail plate 102a and right slide rail 151a is attached to upper surface of right slide rail plate 102b such that fifth wheel hitch assembly 110 and pedestal 155 are located therebetween, inboard of the left and right slide rails 102a, b. Slide rail plates 102a, b and slide rails 151a, b each have longitudinal axes which parallel the longitudinal axis of tractor 109. Slide stop blocks 105a-d are located at each end of each slide rail plate 102a, b. Slide stop blocks 105a-d prevent over travel of pedestal 155. As is shown in the illustration, slide rails 151a, b of the prior art are typically a flange extending inboard of the assembly, slidably receiving flanges 111, 114 of pedestal 155. Slide rails 151a, b typically include gaps, or detents, 176 spaced along the length of the slide rail.

The pedestal 155 may include a means for selectively locking the pedestal in position longitudinally with respect to the slide rail assembly. One example, shown in FIG. 1D, is a pneumatic cylinder 177 mounted in the pedestal from which laterally extend plunger arms 173a, b. A fork member 179 may be mounted to the respective lateral ends of plunger arms 173, where the fork member includes projections, or prongs, 181 that insert into the slide rail gaps 176 when the plungers arms are extended. The engagement of the projections 181 into the gaps 176, thus, prevents longitudinal movement of the pedestal, and, therefore, the fifth wheel assembly.

Figure 4:
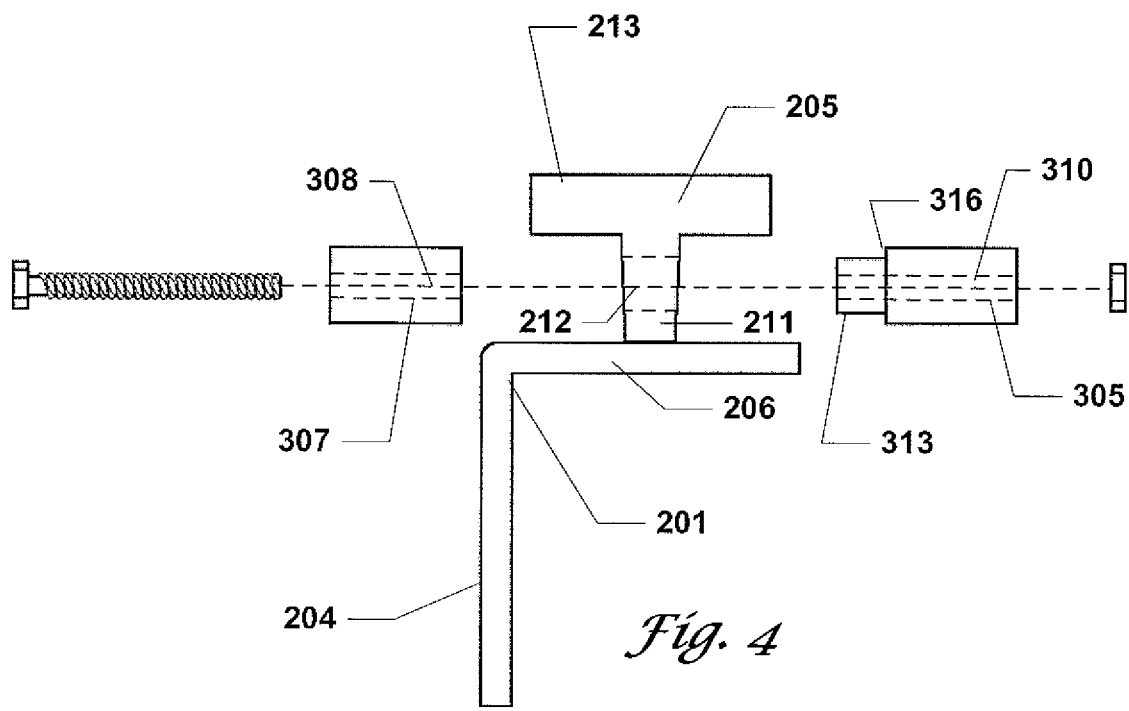
FIG. 4 is an illustrative end-on view of an exemplary slide rail assembly.

In FIGS. 2 through 4, an exemplary slide rail apparatus 200 embodying the principles of the present invention, includes an angle member 201 having a vertical portion 204 and a horizontal portion 206. Preferably, a plurality of apertures 208 are disposed in the vertical portion 204 thereof. A slide rail 205 having a "t-shaped" cross-section is affixed to the top surface of the horizontal portion 206 of the angle member 201 by, for example, welding or fasteners, or both. Slide rail 205 is defined by generally vertical base section 211 and a crossing top section 213. The vertical base section 211 is set upon the horizontal portion of the angle member 201 and includes a series of gaps 212. Gaps 212 are to receive prongs (not shown) that selectively extend laterally from a sliding pedestal which supports the fifth wheel hitch.

As shown in FIG. 3, angle member 201 is mounted to a truck frame member 303 by inserting fasteners, for example, bolts with nuts, into one or more of the plurality of apertures 208 in the vertical portion of angle member and through corresponding apertures bored within the truck frame member 303. The apparatus 200 typically includes two opposing slide rails 205 mounted in parallel (FIG. 2) on consecutive, parallel truck frame members.

Slide rail apparatus 200 may also include a stop block assembly 311 secured to each end. As depicted in FIGS. 3 and 4, stop block assembly 311 includes an inboard block 305 and an outboard block 307, removably fastened together with a threaded fastener with the slide rail 205 vertical portion interposed between them. Both blocks 305, 307 include two or more bores 308, 310 for receiving bolts. The bores 308 within the outboard block 307 correspond to the bores 310 within the inboard block 305 and are also spaced to correspond to adjacent gaps 212 with the slide rail vertical portion. As depicted, block 305, 307 preferably is configured with a rectangular boss 313 surrounding each bore 308, 310 and extending from the interior surface of the block 305, 307 resulting in a shoulder area 316 surrounding the boss 313. The rectangular bosses 313 are dimensioned to fit snugly within adjacent gaps 212 in the slide rail 205 permitting shoulder area 316 to be seated against vertical base section 211 when a fastener is inserted in the bores 308, 310, and draws the blocks 305, 307 toward each other. It will be appreciated that either block may be configured with a boss 313. Alternatively, each block 305, 307 may have a boss 313 located so that it is received in the gap 212 adjacent the boss 313 extending from the opposing block.

Figure 5:
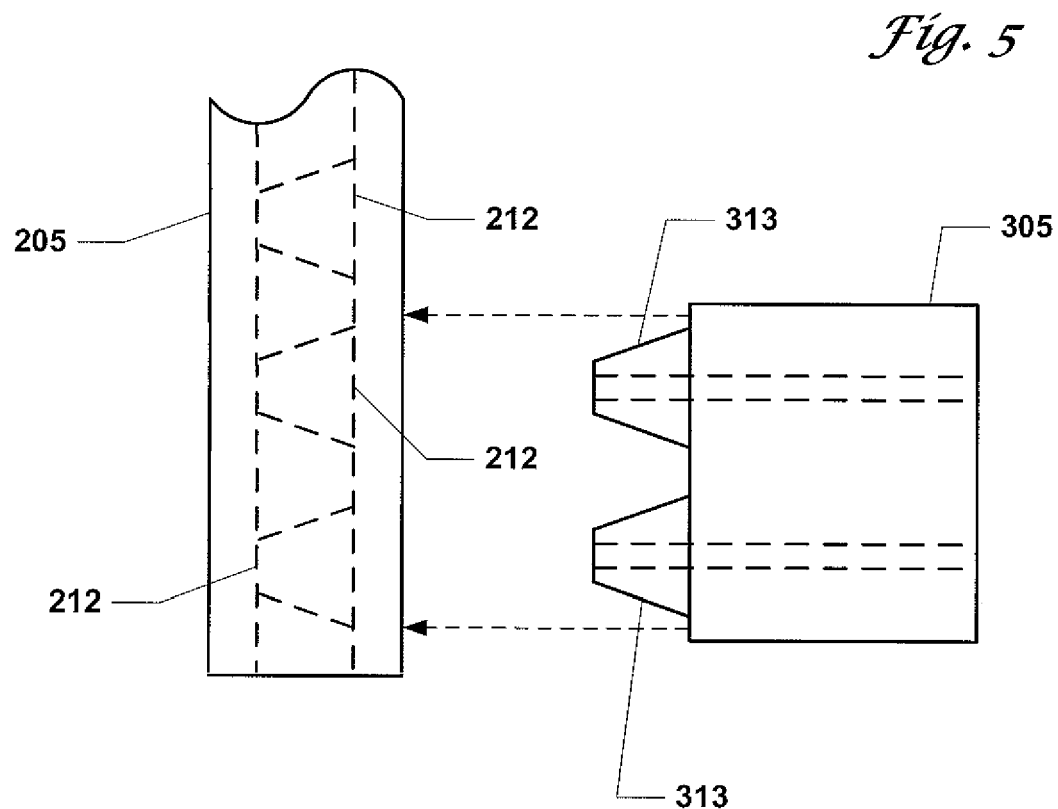
FIG. 5 depicts a top plan view of the slide rail according to a further embodiment thereof.

FIG. 5 presents another exemplary embodiment of the slide rail 205 in which gaps 212 are tapered from the inboard side to the outboard side. The advantages of this feature are that typical fifth wheel slide mechanisms which are disposed between the parallel mounted slide rails, i.e., toward the inboard sides, include a laterally extendable prong member or members which insert into the gaps 212, and are locked in the extended position, preventing sliding of the fifth wheel. Over time, wear on the prongs results in a narrowing of the prong member portion that is inserted in the gaps 212. Tapering the gaps 212, as shown in FIG. 5, means that over time, more of the prong member may be inserted into the gap 212 and maintain secure positioning of the fifth wheel.

Figure 6A:
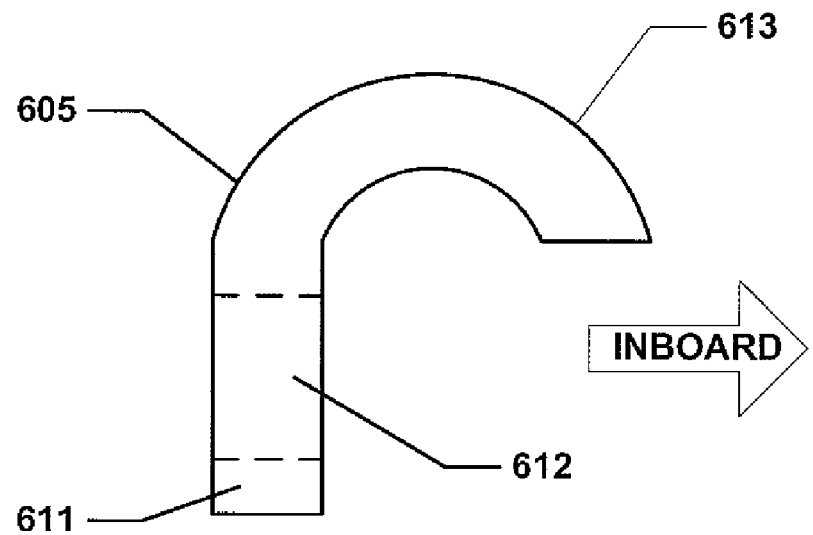
FIG. 6A is a section view of the slide rail according to another embodiment of the present invention.
Figure 6B:
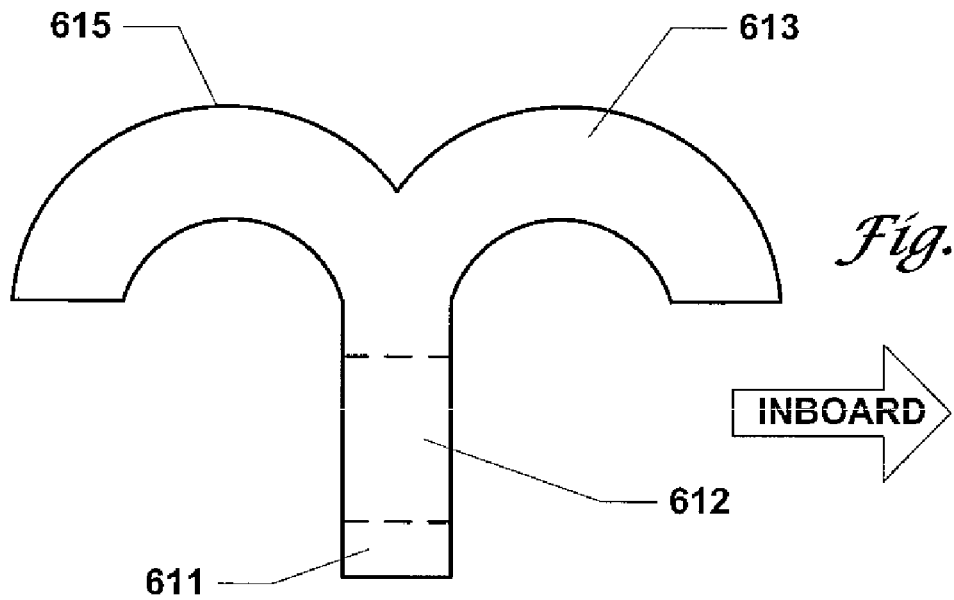
FIG. 6B is a section view of the slide rail according to still another embodiment of the present invention.

It will be appreciated that the slide rail described above offers several advantages over the prior art in fifth wheel hitches. It reduces manufacturing costs by eliminating materials, namely, the slide rail plates and the tie bars. The "t-shaped" rail will better accommodate a lateral load that prior art slide rails. Other cross-section shapes may be employed as well. FIGS. 6A, and B shows two examples of such alternate cross-sections. In FIG. 6A, slide rail 605 includes a vertical lower section 611 that rests on, and is attached to, the angle member as in other embodiments described above. A gap 612 is defined within the vertical portion for receiving slide mechanism prongs as set forth above. An arcuate portion 613 extends toward the rail's 605 inboard side (indicated in the Figure by the arrow). Alternatively, rail 605 could include arcuate extensions 613, 615 toward both the inboard and outboard sides of the rail 605.

As described above and shown in the associated drawings, the present invention comprises a fifth wheel slide rail. While particular embodiments of the invention have been described, it will be understood, however, that the invention is not limited thereto, since modifications may be made by those skilled in the art, particularly in light of the foregoing teachings. It is, therefore, contemplated by the following claims to cover any such modifications that incorporate those features or those improvements that embody the spirit and scope of the present invention.

What is claimed is:

1. A slide rail assembly for a longitudinally adjustable fifth wheel hitch, said assembly configured for mounting to a truck frame member, said slide rail assembly comprising:
   a. an angle member having a vertical portion with a plurality of apertures defined therein for securing said angle member to the vertical portion of a truck frame member using fasteners, and a horizontal portion extending from said vertical portion having a top surface; and
   b. a slide rail having a generally t-shaped cross-section with a horizontal portion and a vertical portion, said vertical portion including a plurality of spaced-apart gaps; and
   c. a stop block assembly including first and second blocks positioned on either side of said slide rail vertical portion, each of said stop blocks having at least two bores, said at least two bores corresponding to the at least two bores in the opposing block for receiving a fastener therein, and wherein at least one stop block includes at least one rectangular boss surrounding at least one of said bores and extending from the block toward said slide rail and configured to be received into said at least one said gap.

2. The slide rail assembly of claim 1, wherein said second block includes two rectangular bosses surrounding said at least two bores, said at least two bores configured to be received within adjacent gaps.

3. The slide rail assembly of claim 1, wherein said gaps have a narrowing width from inboard to outboard with respect to the truck frame.

4. A slide rail assembly for a longitudinally adjustable fifth wheel hitch, said assembly configured for mounting to a parallel truck frame members, said slide rail assembly comprising:
   a. left and right lateral angle members, each having a vertical portion with a plurality of apertures defined therein for securing each said angle member to the vertical portion of each said parallel truck frame member using fasteners, and a horizontal portion extending from said vertical portion having a top surface; and
   b. left and right slide rails, each said slide rail having a generally t-shaped cross-section with a horizontal portion and a vertical portion, each said vertical portion including a plurality of spaced-apart gaps; and
   c. a stop block assembly mounted to each said slide rail, each said stop block assembly including first and second blocks positioned on either side of said slide rail vertical portion, each of said stop blocks having at least two bores, said at least two bores corresponding to the at least two bores in the opposing block for receiving a fastener therein, and wherein at least one stop block includes at least one rectangular boss surrounding at least one of said bores and extending from the block toward said slide rail and configured to be received into said at least one said gap.

5. The slide rail assembly of claim 4, wherein each said second block includes two rectangular bosses surrounding said at least two bores, said at least two bores configured to be received within adjacent gaps.

6. The slide rail assembly of claim 4, wherein said gaps have narrowing widths.

7. The slide rail assembly of claim 6, wherein each said second block includes two rectangular bosses surrounding said at least two bores, said at least two bores configured with narrowing widths to be snugly received within adjacent gaps.

8. A slide rail assembly for a longitudinally adjustable fifth wheel hitch, said assembly configured for mounting to a parallel truck frame members, said slide rail assembly comprising:
   a. left and right lateral angle members, each having a vertical portion with a plurality of apertures defined therein for securing each said angle member to the vertical portion of each said parallel truck frame member using fasteners, and a horizontal portion extending from said vertical portion having a top surface; and
   b. left and right slide rails, each said slide rail having a generally horizontal portion extending toward the interior between said parallel truck frame member and a vertical portion, each said vertical portion including a plurality of spaced-apart gaps; and
   c. a stop block assembly mounted to each said slide rail, each said stop block assembly including first and second blocks positioned on either side of said slide rail vertical portion, each of said stop blocks having at least two bores, said at least two bores corresponding to the at least two bores in the opposing block for receiving a fastener therein, and wherein at least one stop block includes at least one rectangular boss surrounding at least one of said bores and extending from the block toward said slide rail and configured to be received into said at least one said gap.

9. The slide rail assembly of claim 8, wherein each of said slide rails includes a generally t-shaped cross-section.

10. The slide rail assembly of claim 8, wherein each horizontal portion of each of said slide rails includes a generally arcuate portion.

11. The slide rail assembly of claim 10, wherein each said slide rail comprises a second horizontal portion extending from the top of said vertical portion generally toward the exterior of the parallel truck frame members.

12. The slide rail assembly of claim 8, wherein each horizontal portion of each of said slide rails includes a generally arcuate portion extending inboard with respect to the truck frame.

13. The slide rail assembly of claim 12, wherein each said slide rail comprises a second horizontal portion extending outboard with respect to the truck frame.

14. The slide rail assembly of claim 8, wherein said gaps narrow in width from inboard to outboard with respect to the truck frame.

15. The slide rail assembly of claim 14, wherein each horizontal portion of each of said slide rails includes a generally arcuate portion extending inboard with respect to the truck frame.

16. The slide rail assembly of claim 15, wherein each said slide rail comprises a second horizontal portion extending outboard with respect to the truck frame.

17. The slide rail assembly of claim 14, wherein each of said slide rails includes a generally t-shaped cross-section.

* * * * *